United States Patent
Chang et al.

(10) Patent No.: US 8,432,073 B2
(45) Date of Patent: Apr. 30, 2013

(54) POWER GENERATING DEVICE

(75) Inventors: Chi-Lone Chang, Hsinchu County (TW); Chi-Yuan Chin, Hsinchu (TW)

(73) Assignee: Silicon Touch Technology Inc., Hsinchu (TW)

( * ) Notice: Subject to any disclaimer, the term of this patent is extended or adjusted under 35 U.S.C. 154(b) by 0 days.

(21) Appl. No.: 13/553,791

(22) Filed: Jul. 19, 2012

(65) Prior Publication Data

US 2012/0280657 A1    Nov. 8, 2012

Related U.S. Application Data

(62) Division of application No. 12/605,387, filed on Oct. 26, 2009, now Pat. No. 8,310,114.

(30) Foreign Application Priority Data

Jul. 16, 2009  (TW) .............................. 98124140 A

(51) Int. Cl.
*H02K 47/00* (2006.01)
*H02K 7/14* (2006.01)

(52) U.S. Cl.
USPC .............. 310/50; 310/113; 310/339; 310/37; 310/47

(58) Field of Classification Search ............ 310/50, 310/113, 339, 37, 47, 75 R, 80; 320/114
See application file for complete search history.

(56) References Cited

U.S. PATENT DOCUMENTS

| 3,518,465 | A  | * | 6/1970 | Jepson et al. | 310/47 |
| 4,475,075 | A  | * | 10/1984 | Munn | 322/1 |
| 8,193,769 | B2 | * | 6/2012 | Azancot et al. | 320/108 |
| 2002/0047333 | A1 | * | 4/2002 | You | 310/47 |
| 2002/0121844 | A1 | * | 9/2002 | Ghandi et al. | 310/339 |
| 2003/0184165 | A1 | * | 10/2003 | Chiu | 310/47 |

(Continued)

FOREIGN PATENT DOCUMENTS

| CN | 1262803 | 8/2000 |
| CN | 101442248 | 5/2009 |

(Continued)

OTHER PUBLICATIONS

"Second Office Action of China counterpart application" issued on Dec. 14, 2012, p1-p5, in which the listed references were cited.

*Primary Examiner* — Tran Nguyen
*Assistant Examiner* — Alex W Mok
(74) *Attorney, Agent, or Firm* — Jianq Chyun IP Office

(57) ABSTRACT

A power generating device includes a carrier module, a stator module, a rotor module and a power generating module. The stator module is assembled to the carrier module, and has a first circuit board and a plurality of driving coils. The rotor module is located in an electromagnetic field, and has a multipolar magnetic rotor and a rotating axle. A magnetic field of the multipolar magnetic rotor interacts with the electromagnetic field to make the rotor module rotating relative to the stator module, and make the multipolar magnetic rotor producing a varying magnetic field. The power generating module is located in the varying magnetic field, and has a second circuit board and a plurality of induction coils. The induction coils induct the varying magnetic field to output an induction circuit to the second circuit board.

14 Claims, 12 Drawing Sheets

U.S. PATENT DOCUMENTS

| | | |
|---|---|---|
| 2004/0204180 A1* | 10/2004 | Liao .................. 455/573 |
| 2006/0032687 A1* | 2/2006 | Park et al. .............. 180/206 |
| 2006/0250036 A1* | 11/2006 | Kayama et al. .......... 310/81 |
| 2008/0106149 A1* | 5/2008 | Yen .................. 307/39 |
| 2008/0220827 A1* | 9/2008 | Lin .................. 455/573 |
| 2009/0033169 A1* | 2/2009 | Takeuchi ............ 310/156.32 |
| 2009/0051317 A1 | 2/2009 | Fridhendler et al. |
| 2009/0058360 A1* | 3/2009 | Kuo .................. 320/114 |
| 2009/0108802 A1* | 4/2009 | Wu .................. 320/103 |

FOREIGN PATENT DOCUMENTS

| | | | |
|---|---|---|---|
| JP | 5146134 | | 6/1993 |
| TW | 298352 | * | 2/1997 |
| TW | 346287 | * | 11/1998 |
| TW | 500274 | * | 8/2002 |
| TW | I294205 | * | 3/2008 |
| TW | M338498 | * | 8/2008 |
| TW | 200837280 | * | 9/2008 |

* cited by examiner

POWER GENERATING DEVICE

CROSS-REFERENCE TO RELATED APPLICATION

This application is a divisional application of and claims priority benefit of an U.S. application Ser. No. 12/605,387, filed on Oct. 26, 2009, now pending, which claims the priority benefit of Taiwan application serial no. 98124140, filed on Jul. 16, 2009. The entirety of each of the above-mentioned patent applications is hereby incorporated by reference herein and made a part of specification.

BACKGROUND OF THE INVENTION

1. Field of the Invention

The present invention relates to a power generating device. More particularly, the present invention relates to a power generating device applied to a handheld electronic device.

2. Description of Related Art

A handheld electronic device refers to an electronic device that can be held and operated by a user, which has relatively small size and light weight for the user to carry around. A commonly used handheld electronic device is, for example, a mobile phone, a multimedia player, a personal digital assistant, a handheld computer, a handheld game machine and a handheld satellite navigator, etc.

Since power required by the handheld electronic device is generally supplied by a rechargeable battery within the handheld electronic device, a serviceable time of the handheld electronic device is determined by a power storage capacity of the rechargeable battery. If the user stays outdoors for a long time, the rechargeable battery cannot be charged, which is inconvenient for utilization.

A "hand-pulled power generating device" according to a Taiwan patent No. 121459, a "portable manual power generating device" according to a Taiwan patent No. 141853, a "handheld manual power generating device" according to a Taiwan patent No. 226073, and a "manual charger" according to a Taiwan utility model patent No. M338498 all disclose an external charging device. However, the external charging device is still inconvenient for utilization.

Therefore, a "self-charge handheld phone device" according to a Taiwan patent No. I294205 discloses a self-charge handheld phone device having a linear power generating device, and such conventional power generating device can be inlaid to a mobile phone. Moreover, a technique of using a vibration motor of the mobile phone as the power generating device is also disclosed, for example, a "power generating device and communication device using the same" according to a Taiwan patent No. 96107741. However, these two conventional power generating devices have relatively more components, so that assembling processes thereof are relatively difficult, and accordingly costs thereof cannot be reduced.

SUMMARY OF THE INVENTION

The present invention is directed to a power generating device, which has an automatic charging mode and a manual charging mode for different utilizations.

The present invention provides a power generating device adapted for charging a handheld electronic device. The power generating device includes a carrier module, a stator module, a rotor module and a power generating module. The carrier module has a bearing. The stator module is assembled to the carrier module, and has a first circuit board and a plurality of driving coils. A current is input to the driving coils through the first circuit board to generate an electromagnetic field. The rotor module is located in the electromagnetic field, and has a multipolar magnetic rotor and a rotating axle. The rotating axle passes through the multipolar magnetic rotor, and one end of the rotating axle is fixed into the bearing. A magnetic field of the multipolar magnetic rotor interacts with the electromagnetic field to make the rotor module rotating relative to the stator module, and make the multipolar magnetic rotor generating a varying magnetic field. The power generating module is located in the varying magnetic field, and has a second circuit board and a plurality of induction coils. The induction coils induct the varying magnetic field to output an induction current to the second circuit board.

In an embodiment of the present invention, the power generating device further includes an energy storage module electrically connected to the second circuit board, so as to store the induction current.

In an embodiment of the present invention, the energy storage module includes a capacitor or a rechargeable battery.

In an embodiment of the present invention, the power generating device further includes a cover assembled to the carrier module, and the stator module, the rotor module and the power generating module are located in a containing space defined by the cover and the carrier module.

In an embodiment of the present invention, the stator module has a driving integrated circuit disposed on the first circuit board, so as to control the current input to the driving coils.

In an embodiment of the present invention, the stator module has a Hall integrated circuit disposed on the first circuit board, so as to induct a magnetic flux of the electromagnetic field.

In an embodiment of the present invention, the rotor module has a weight unit disposed at a side edge of the multipolar magnetic rotor, so as to generate vibration when the rotor module is rotated.

In an embodiment of the present invention, the rotor module has a fixing unit, and the fixing unit fixes the multipolar magnetic rotor, the rotating axle and the weight unit.

In an embodiment of the present invention, the power generating device further includes a manual operating module, a steering module and a one-way bearing. The steering module is engaged to the manual operating module. The one-way bearing covers the rotating axle, and is unidirectionally born between the rotating axle and the steering module. When the driving coils are not input by the current, the manual operating module drives the one-way bearing and the rotating axle to rotate together through the steering module, so that the rotor module is rotated relative to the power generating module, and the induction coils generate a first induction current, and meanwhile the rotor module is rotated relative to the stator module, and the driving coils generate a second induction current.

In an embodiment of the present invention, the manual operating module includes a rack meshed with the steering module.

In an embodiment of the present invention, the steering module includes a first gear module, a second gear module, a third gear module and a rotation shaft. The first gear module is meshed with the manual operating module, and the first gear module and the second gear module cover the rotation shaft. The second gear module is meshed with the third gear module, and the third gear module covers the one-way bearing. The manual operating module drives the second gear module to rotate through the first gear module, and the second gear module drives the one-way bearing and the rotating axle to rotate together through the third gear module, so that the rotating axle drives the rotor module to rotate. Since the second gear module and the third gear module have a high tooth ratio, rotation of the third gear module is accelerated.

In an embodiment of the present invention, the power generating device further includes a first top cover, and the second gear module, the third gear module and the one-way bearing are located in a first containing space defined by internal of the first top cover.

In an embodiment of the present invention, the first top cover has an assembling hole, the manual operating module and the first gear module are located on the first top cover, and the rotation shaft passes through the assembling hole and is covered by the first gear module.

In an embodiment of the present invention, the manual operating module includes a wheel meshed with the steering module.

In an embodiment of the present invention, the power generating device further includes a second top cover, and the manual operating module, the steering module and the one-way bearing are located in a second containing space defined by internal of the second top cover, and the manual operating module partially protrudes out from a sidewall of the second top cover.

In an embodiment of the present invention, the power generating device further includes a flexible piezoelectric module surrounding the rotation shaft, wherein one end of the flexible piezoelectric module is connected to the rotation shaft. The manual operating module drives the rotation shaft and the flexible piezoelectric module to rotate together through the first gear module, so that the flexible piezoelectric module is tightened to generate a current. When the flexible piezoelectric module is released, an elastic restoring force is generated to drive the rotation shaft and the first gear module to rotate inversely, and the first gear module drives the one-way bearing and the rotating axle to rotate through the second gear module, so that the rotating axle drives the rotor module to rotate.

In an embodiment of the present invention, the flexible piezoelectric module includes a flexible metal substrate and a plurality of flexible piezoelectric sheets, wherein the flexible piezoelectric sheets are located at a side of the flexible metal substrate, and the flexible piezoelectric sheets are connected in parallel to increase an output current amount.

The present invention provides a handheld electronic device having an automatic charging mode and a manual charging mode. The handheld electronic device includes a body, a slide cover and a manual operating module. The body has a rechargeable battery and a power generating device. The power generating device has an induction coil, a multipolar magnetic rotor and a driving coil. The driving coil is powered by the rechargeable battery under the automatic charging mode, and drives the multipolar magnetic rotor to rotate, so that the induction coil generates an induction current. The slide cover is slidingly disposed on the body. The manual operating module is disposed on the slide cover. When power of the rechargeable battery is inadequate, the manual operating module drives the multipolar magnetic rotor to rotate, so that the driving coil and the induction coil respectively generate an induction current under the manual charging mode to charge the rechargeable battery.

In an embodiment of the present invention, the power generating device further includes a weight unit disposed at a side edge of the multipolar magnetic rotor, so as to generate vibration when the multipolar magnetic rotor is rotated.

The present invention provides another handheld electronic device having an automatic charging mode and a manual charging mode. The handheld electronic device includes a body and a manual operating module disposed on the body. The body has a rechargeable battery and a power generating device. The power generating device has an induction coil, a multipolar magnetic rotor and a driving coil. The driving coil is powered by the rechargeable battery under the automatic charging mode, and drives the multipolar magnetic rotor to rotate, so that the induction coil generates an induction current. When the power of the rechargeable battery is inadequate, the manual operating module drives the multipolar magnetic rotor to rotate, so that the driving coil and the induction coil respectively generate an induction current under the manual charging mode to charge the rechargeable battery.

In an embodiment of the present invention, the power generating device further includes a weight unit disposed at a side edge of the multipolar magnetic rotor, so as to generate vibration when the multipolar magnetic rotor is rotated.

Accordingly, in the power generating device of the present invention, the induction coils output an induction current to automatically charge the handheld electronic device according to the varying magnetic field generated by the multipolar magnetic rotor. Moreover, the power generating device can also manually charge the handheld electronic device by converting mechanical energy generated by the manual operating module into electrical energy.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
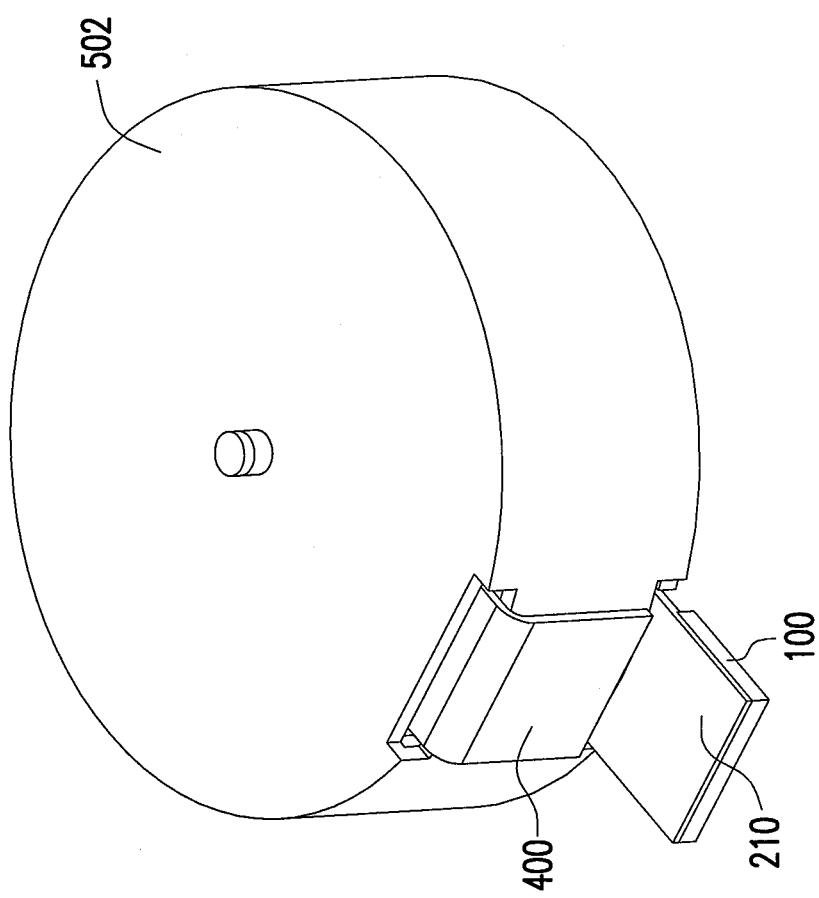
FIG. 1 is a schematic diagram illustrating a power generating device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
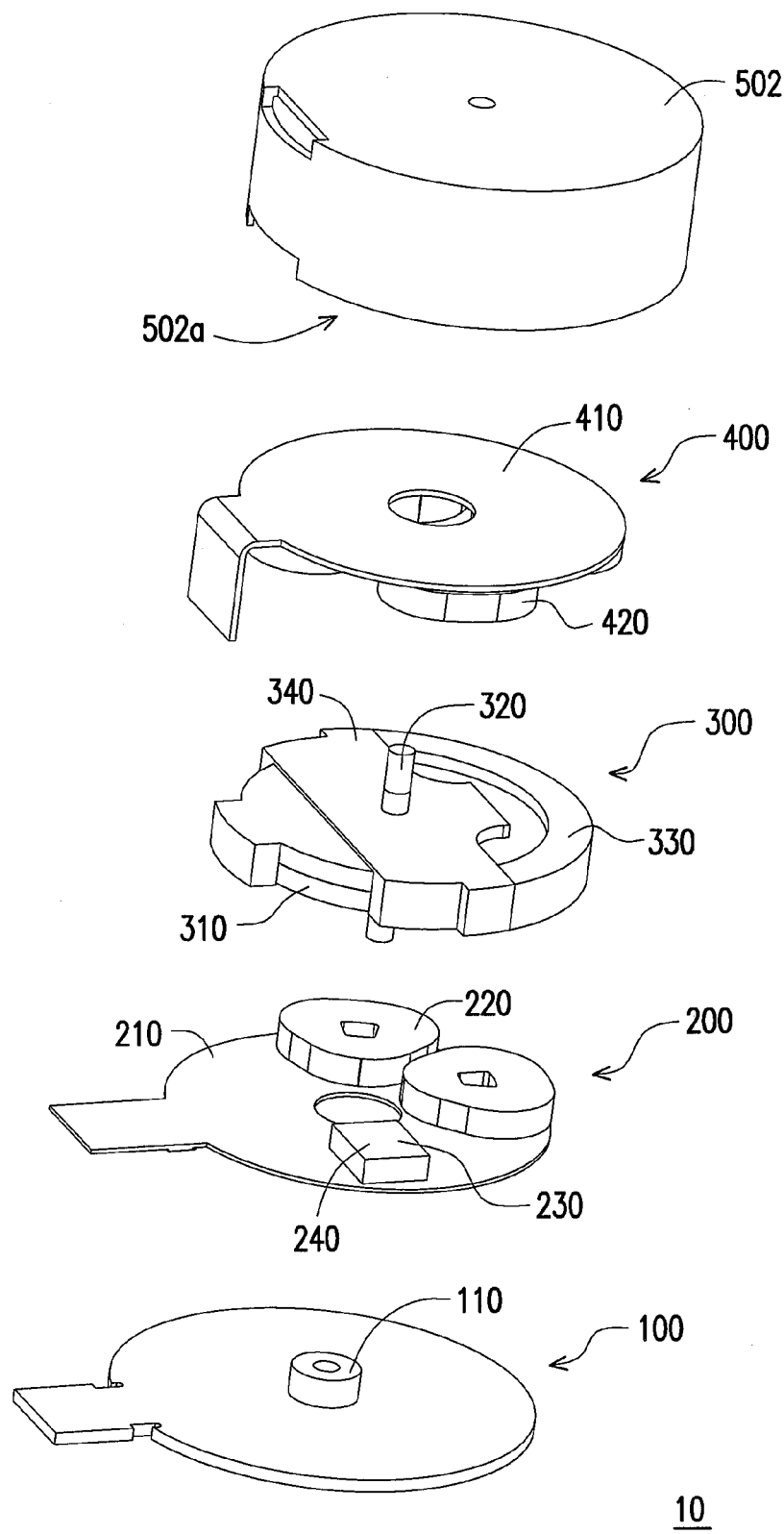
FIG. 2 is an exploded view of a power generating device of FIG. 1.

FIG. 1 is a schematic diagram illustrating a power generating device according to an embodiment of the present invention. FIG. 2 is an exploded view of the power generating device of FIG. 1. Referring to FIG. 1 and FIG. 2, the power generating device 10 is adapted to charge a handheld electronic device 20 (shown in FIG. 5). The power generating device 10 includes a carrier module 100, a stator module 200, a rotor module 300 and a power generating module 400. In the present embodiment, the power generating device 100 can further include a cover 502 assembled to the carrier module 100, which is used for protecting the aforementioned modules. In other words, the stator module 200, the rotor module 300 and the power generating module 400 are located in a containing space 502a defined by the cover 502 and the carrier module 100.

The stator module 200 is assembled to the carrier module 100, and has a first circuit board 210 and a plurality of driving coils 220. When a rechargeable battery (not shown) of the handheld electronic device 20 has power, the rechargeable battery inputs a current to the driving coils 220 through the first circuit board 210 and drives the driving coils 220 to generate an electromagnetic field. Moreover, in the present embodiment, the stator module 200 has a driving integrated circuit 230 and a Hall integrated circuit 240, and the two integrated circuits 230 and 240 can be integrated on the first circuit board 210. In addition, the driving integrated circuit 230 can be used to control the current input to the driving coils 220, and the Hall integrated circuit 240 can be used to induct a magnetic flux of the electromagnetic field.

Figure 3:
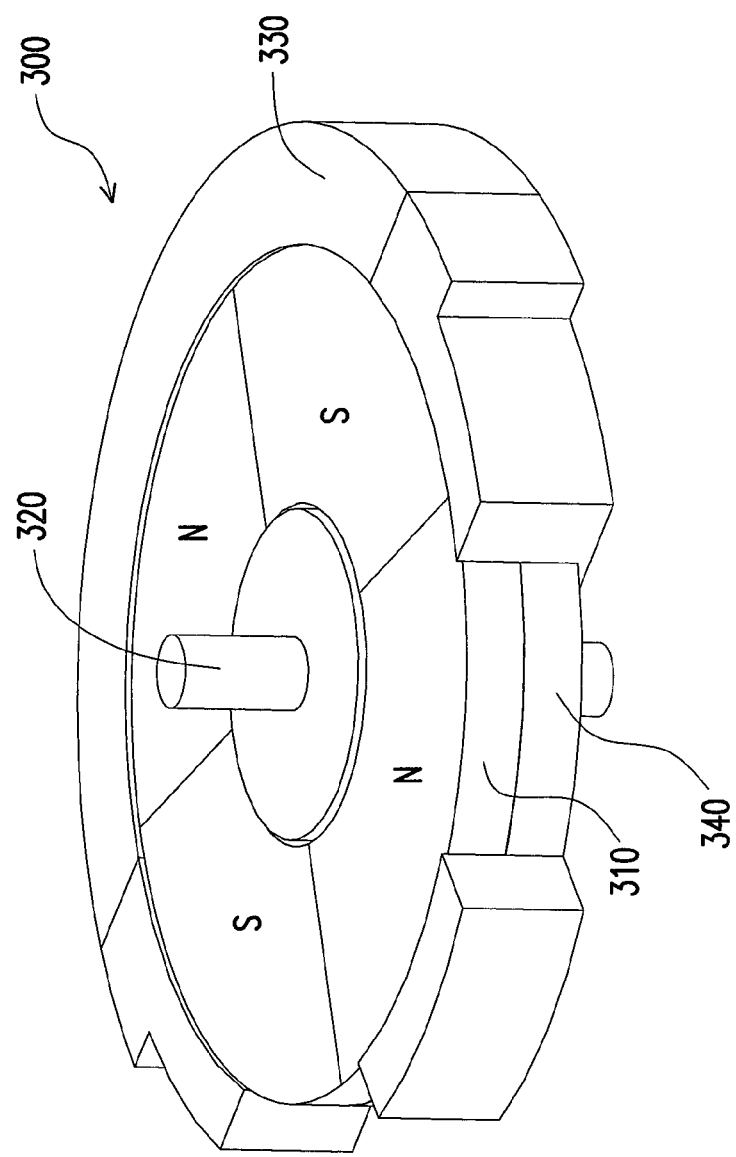
FIG. 3 is a schematic diagram illustrating a rotor module of FIG. 1 without a fixing unit.

FIG. 3 is a schematic diagram illustrating a rotor module of FIG. 1 without a fixing unit. Referring to FIG. 2 and FIG. 3, in the present embodiment, the rotor module 300 is located in the electromagnetic field generated by the driving coils 220, and has a multipolar magnetic rotor 310, a rotating axle 320, a weight unit 330 and a fixing unit 340. The rotating axle 320 passes through the multipolar magnetic rotor 310, and a lower end of the rotating axle 320 is fixed into a bearing 110 of the carrier module 100. The weight unit 330 is disposed at a side edge of the multipolar magnetic rotor 310. Therefore, when the rotor module 300 is rotated, it may have a vibration effect under a function of the weight unit 330. Moreover, the fixing unit 340 is used to fix the multipolar magnetic rotor 310, the rotating axle 320 and the weight unit 330.

In detail, when the rechargeable battery has power, a magnetic field of the multipolar magnetic rotor 310 interacts with the electromagnetic field generated by the driving coils 220 to generate an acting force, which can make the rotor module 300 to rotate relative to the stator module 200, and make the multipolar magnetic rotor 310 to generate a varying magnetic field. Due to a function of an unbalanced force of the weight unit 330, when the rotor module 300 is rotated, the rotor module 300 can be vibrated due to the unbalanced force, so as to provide a vibration function for the handheld electronic device 20.

Figure 4:
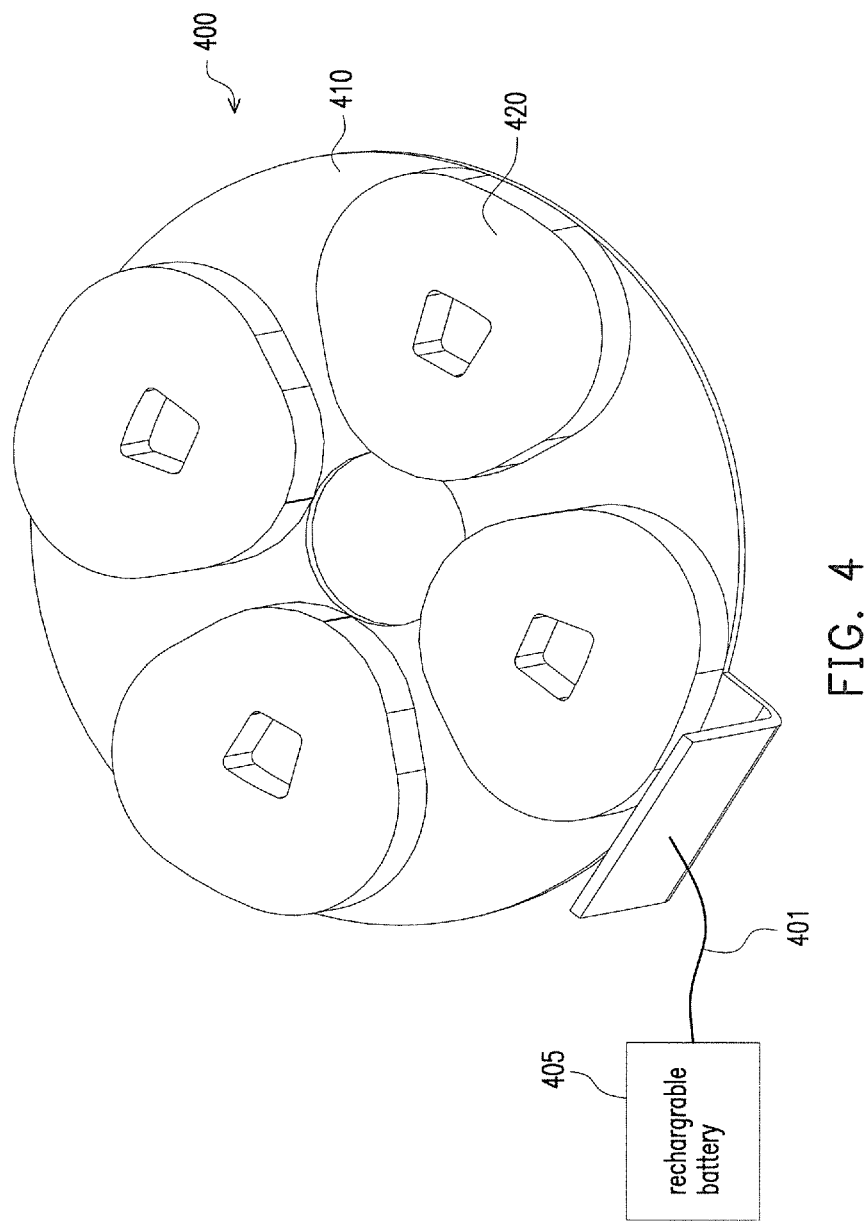
FIG. 4 is another point of view of a power generating module of FIG. 1.

FIG. 4 is another point of view of the power generating module of FIG. 1. Referring to FIG. 2, FIG. 3 and FIG. 4, the power generating module 400 is located in the varying magnetic field generated by the multipolar magnetic rotor 310, and has a second circuit board 410 and a plurality of induction coils 420. It should be noticed that the induction coils 420 can induct the varying magnetic field to output an induction current to the second circuit board 410. Therefore, the handheld electronic device 20 can be charged by the induction current generated by the power generating device 10. Namely, the chargeable battery can be non-periodically charged by the power generating device 10 under the automatic charging mode. For example, a mobile phone can be charged under a call receiving vibration mode or a message receiving vibration mode. Moreover, the power generating device 10 can further includes an energy storage module electrically connected to the second circuit board 410 through a conducting line 401, which is used for storing the induction current. In the present embodiment, the energy storage module can be a capacitor or a rechargeable battery 405 (which can be the rechargeable battery used for supplying power or a spare battery).

Figure 5:
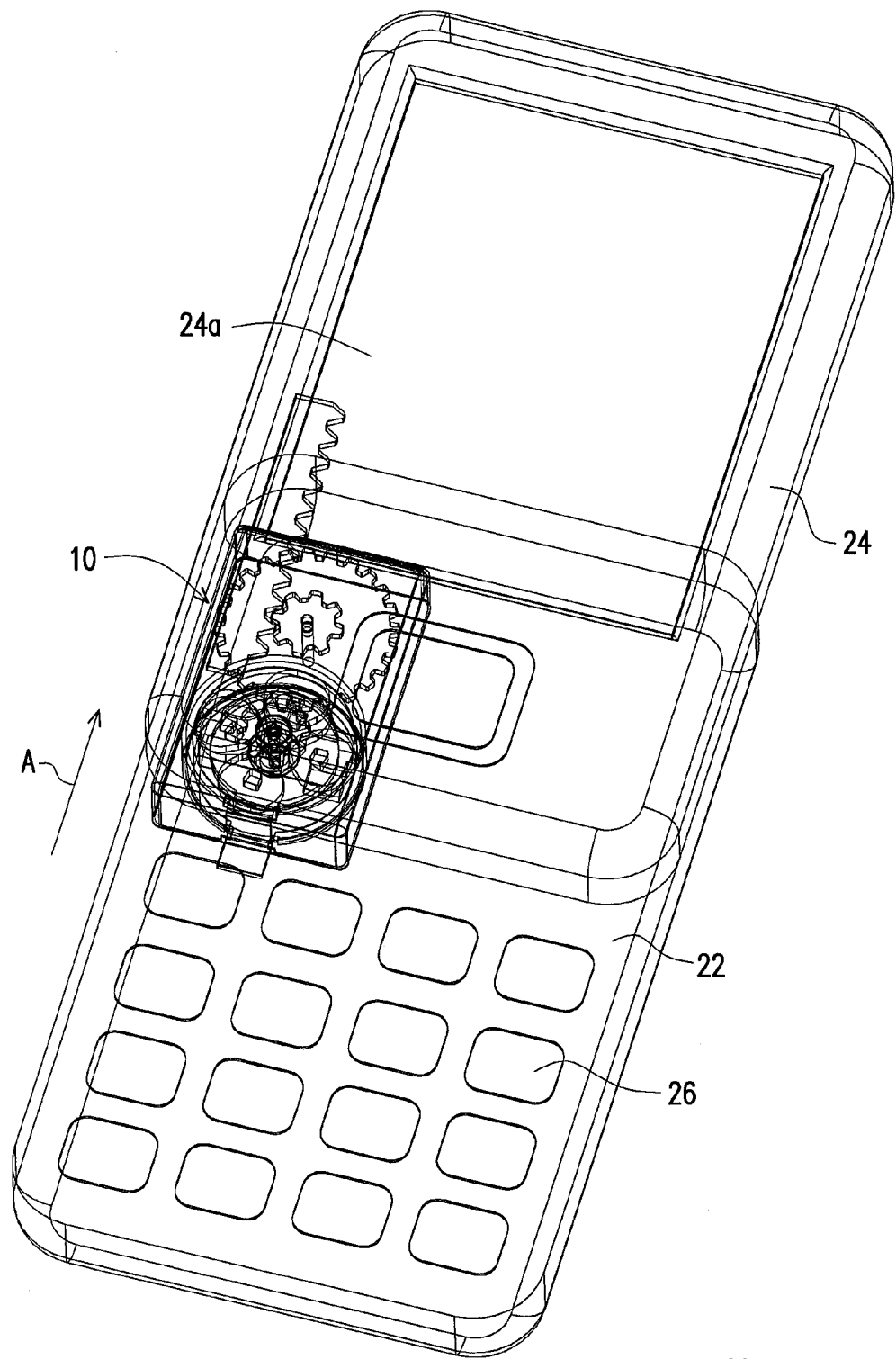
FIG. 5 is a perspective view of a handheld electronic device assembled with a power generating device according to another embodiment of the present invention.

FIG. 5 is a perspective view of a handheld electronic device assembled with a power generating device according to another embodiment of the present invention. Referring to FIG. 5, in the present embodiment, the handheld electronic device 20 is, for example, a slide mobile phone, though the present invention is not limited thereto, and other handheld electronic devices such as a multimedia player, a personal digital assistant, a global positioning system (GPS) receiver, a handheld computer or a handheld game machine can also be applied.

The handheld electronic device 20 includes a body 22, a slide cover 24 and a keyboard module 26. The slide cover 240 is slidingly disposed on the body 22, and has a display screen 24a. When a user pushes the slide cover 24 to slide relative to the body 22 along an operation direction A, the keyboard module 26 on the body 22 can be exposed. Therefore, the user can dial a phone call through the keyboard module 26. Conversely, when the handheld electronic device 20 is no longer used, the slide cover 24 can be pushed back to its original position.

Particularly, when the power of the rechargeable battery within the handheld electronic device 20 is exhausted, the handheld electronic device 20 can be manually charged by the power generating device 10 by sliding the slide cover 24 relative to the body 22. The manual charging mode of the power generating device 10 is described in detail below.

Figure 6:
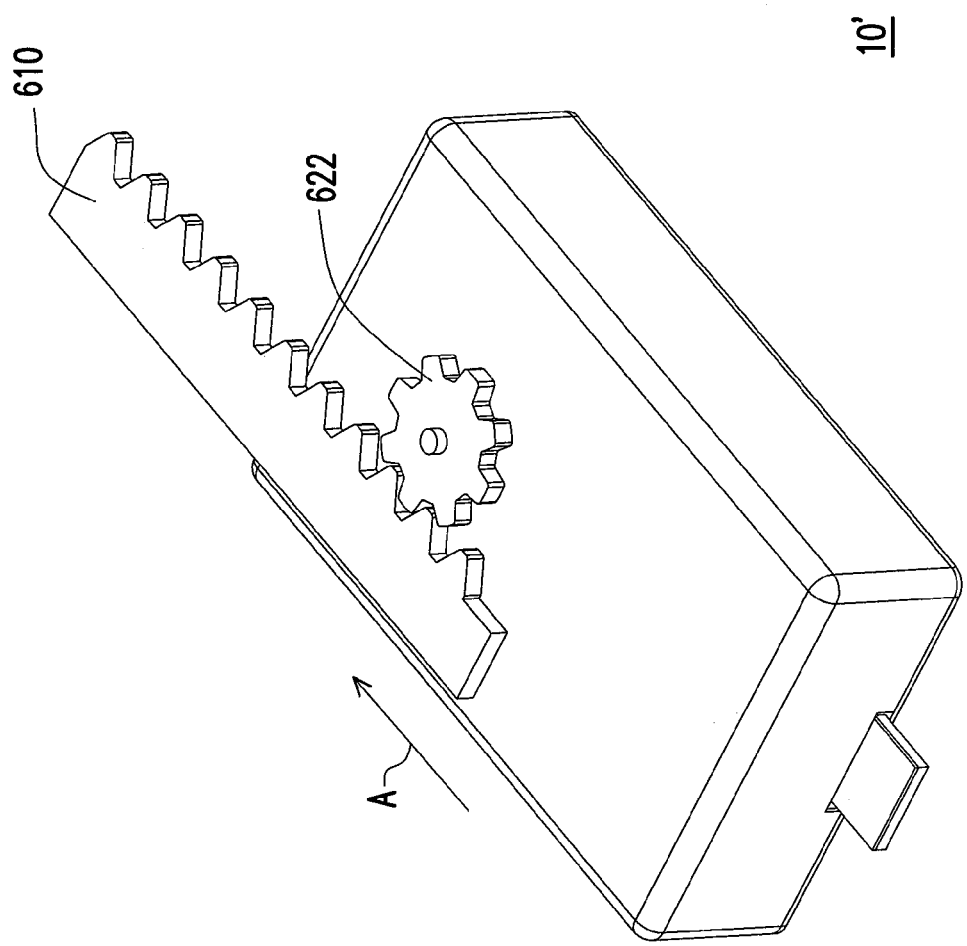
FIG. 6 is a schematic diagram of a power generating device of FIG. 5.
Figure 7:
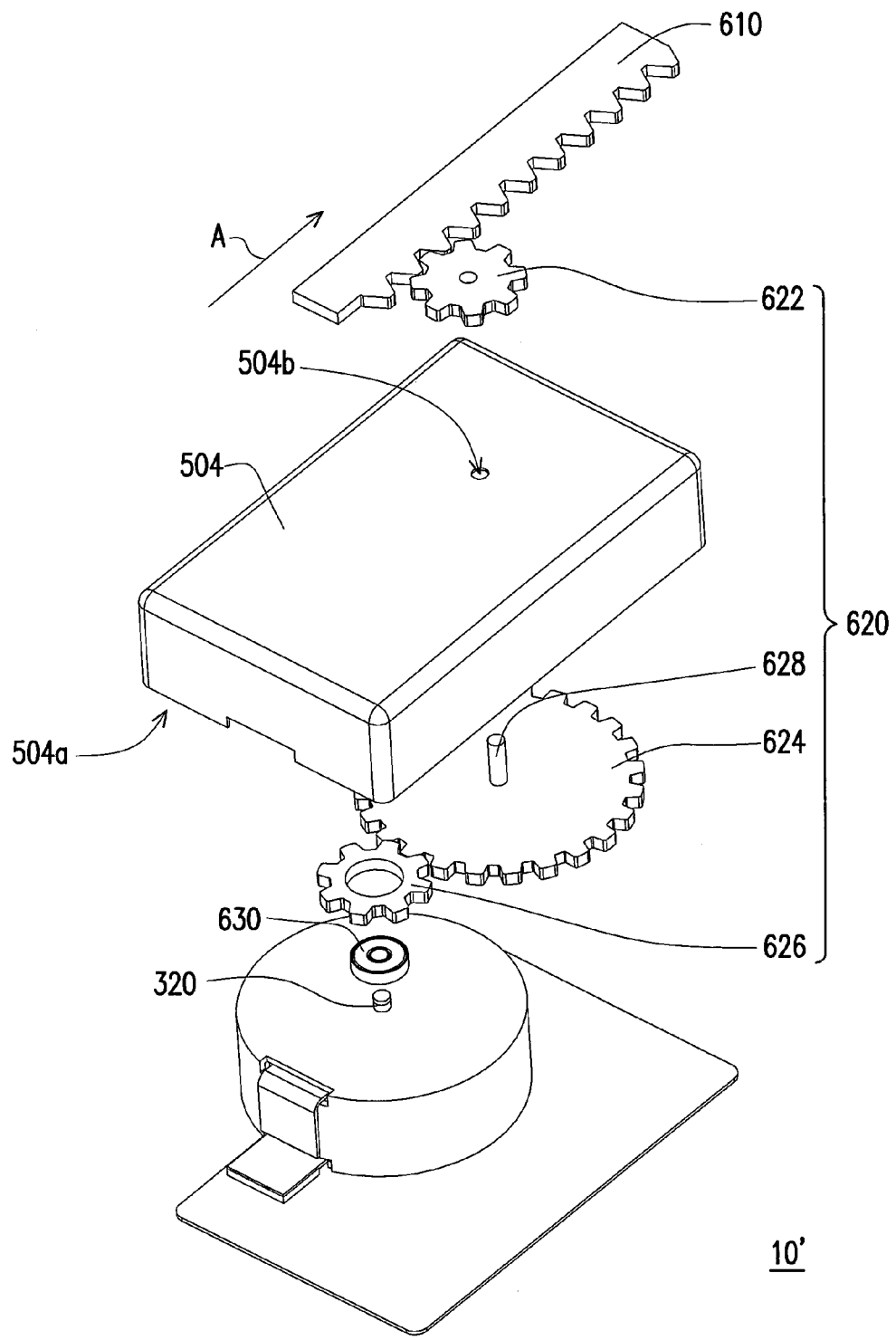
FIG. 7 is a partial exploded diagram of a power generating device of FIG. 6.

FIG. 6 is a schematic diagram of the power generating device of FIG. 5. FIG. 7 is a partial exploded diagram of the power generating device of FIG. 6. Referring to FIG. 6 and FIG. 7, the power generating device 10' further includes a manual operating module 610, a steering module 620 and a one-way bearing 630. The steering module 620 is engaged to the manual operating module 610. For example, the manual operating module 610 can be a rack meshed with a first gear module 622 of the steering module 620. Moreover, the one-way bearing 630 covers the rotating axle 320, and is unidirectionally born between the rotating axle 320 and the steering module 620.

The steering module 620 further includes a second gear module 624, a third gear module 626 and a rotation shaft 628. The first gear module 622 and the second gear module 624 cover the rotation shaft 628. The second gear module 624 is meshed with the third gear module 626, and the third gear module 626 covers the one-way bearing 630.

In the present embodiment, the power generating device 10' further includes a first top cover 504, and the second gear module 624, the third gear module 626 and the one-way bearing 630 are all located in a containing space 504a defined by internal of the first top cover 504. Moreover, the first top cover 504 has an assembling hole 504b. The manual operating module 610 and the first gear module 622 are located on the first top cover 504, and the rotation shaft 628 passes through the assembling hole 504a, and is covered by the first gear module 622.

When the slide cover 24 is slid relative to the body 22 along the operation direction A, the slide cover 24 drives the manual operating module 610 to move along the operation direction A, and accordingly drives the first gear module 622 to rotate clockwise. The first gear module 622 can drive the second gear module 624 to rotate clockwise through the rotation shaft 628. Therefore, the third gear module 626 meshed with the second gear module 624 can be rotated anticlockwise, and can drive the one-way bearing 630 to rotate anticlockwise. Now, the one-way bearing 630 is idle, and does not rotate the rotating axle 320.

When the slide cover 24 is slid relative to the body 22 along an operation direction A, the slide cover 24 drives the manual operating module 610 to move along the operation direction A, and accordingly drives the first gear module 622 to rotate anticlockwise. The first gear module 622 can drive the second gear module 624 to rotate anticlockwise through the rotation shaft 628. Therefore, the third gear module 626 meshed with the second gear module 624 can be rotated clockwise, and can drive the one-way bearing 630 and the rotating axle to rotate clockwise. When the handheld electronic device 20 still has power, the one-way bearing 630 can be unidirectionally rotated without driving the rotating axle 320 to rotate. Particularly, the first gear module 622 and the second gear module 624 may have different number of teeth for adjusting a speed ratio.

Referring to FIG. 2, FIG. 6 and FIG. 7, in brief, the manual operating module 610 can drive the one-way bearing 630 and the rotating axle 320 to rotate together through the steering module 620. Therefore, the rotating axle 320 can drive the rotor module 300 to rotate relative to the power generating module 400, so that the induction coils 420 of the power generating module 400 generate a first induction current. Meanwhile, the rotor module 300 is rotated relative to the stator module 200, so that the driving coils 220 of the stator module 200 generate a second induction current.

Therefore, when the power of the handheld electronic device 20 is inadequate, and the current cannot be input to the driving coils 220 (shown in FIG. 2), the slide cover 24 can be slid relative to the body 22 along the operation direction A, so that the induction coils 420 can generate the first induction current, and the driving coils 220 can generate the second induction current, so as to manually charge the handheld electronic device 20.

Figure 8:
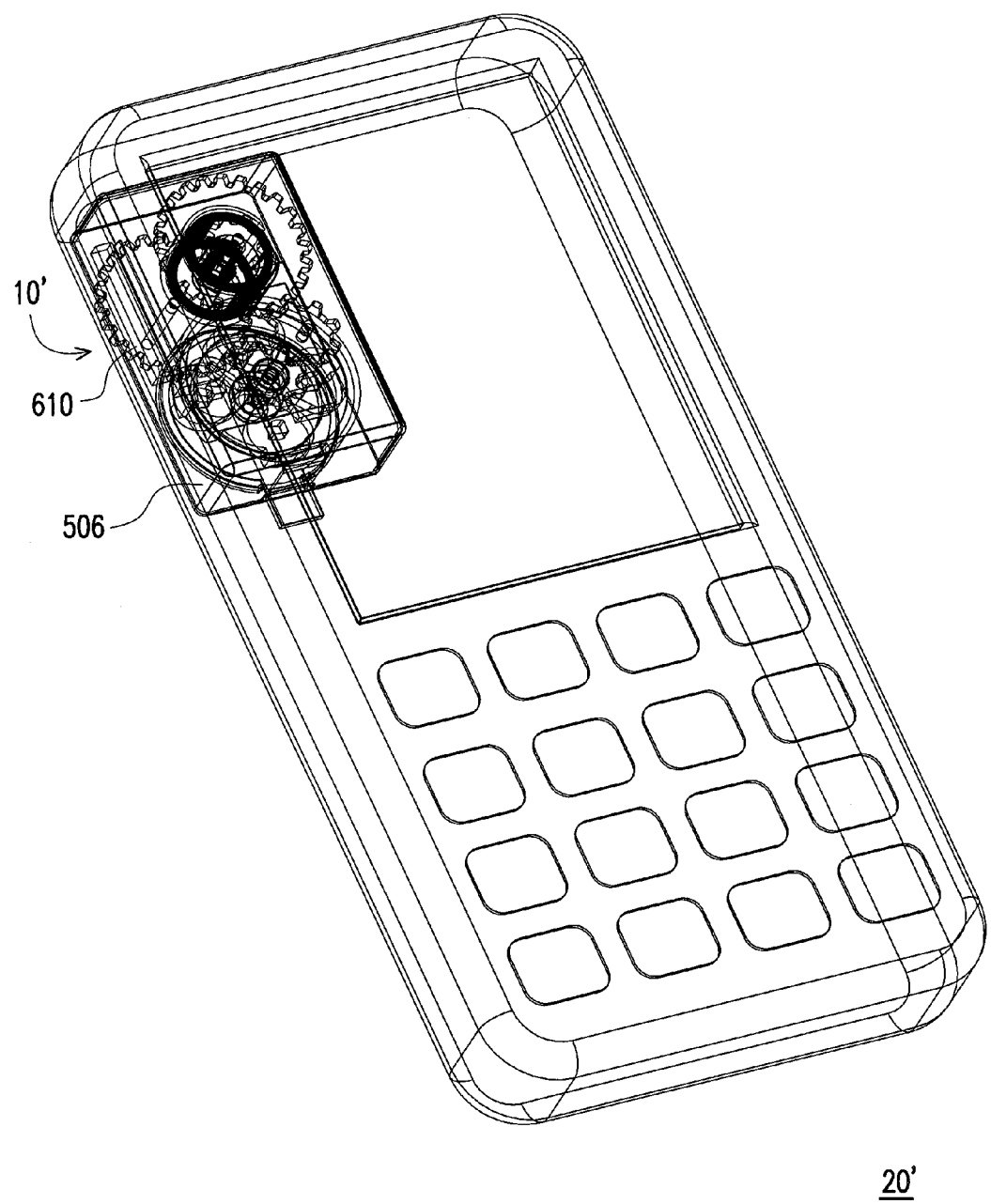
FIG. 8 is a perspective view of a handheld electronic device assembled with a power generating device according to still another embodiment of the present invention.
Figure 9:
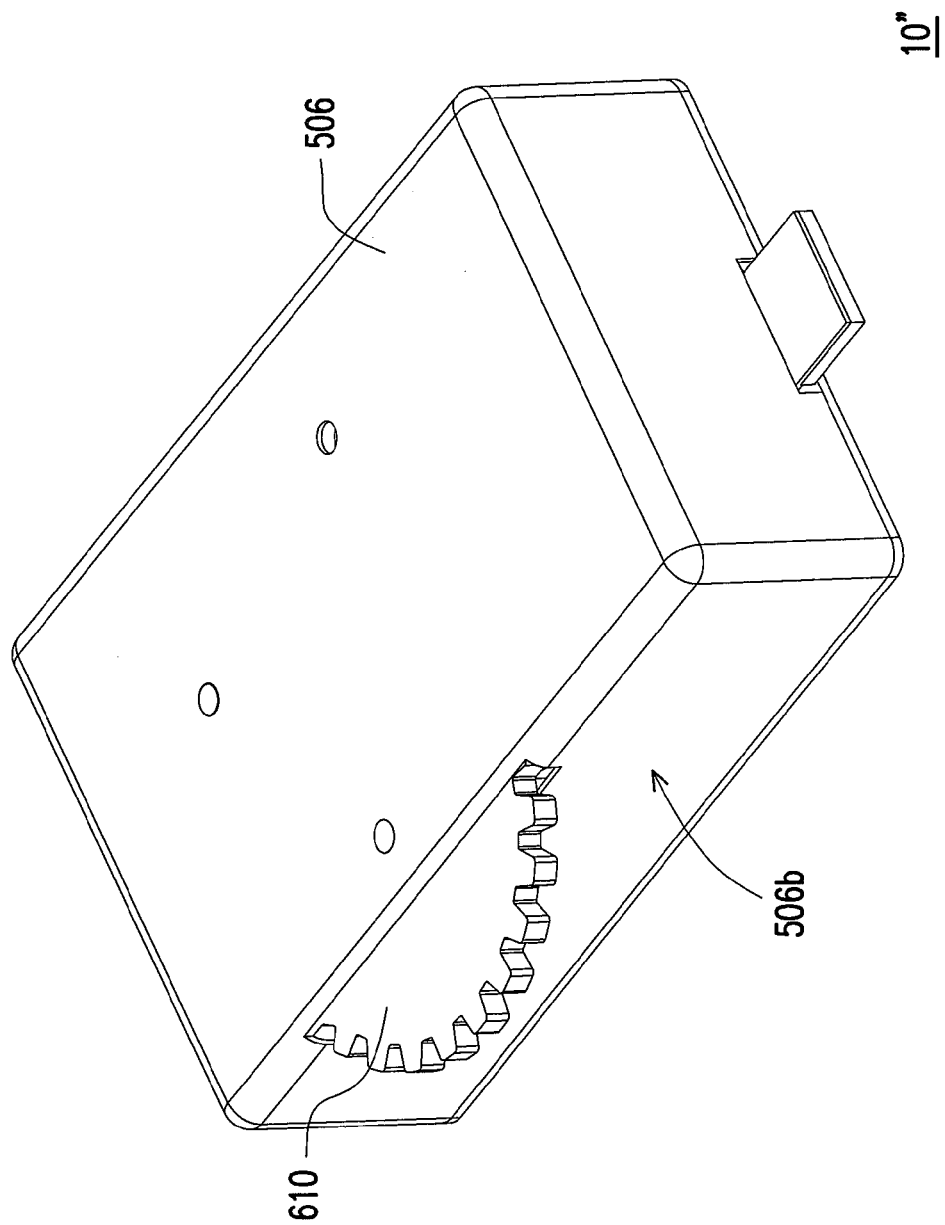
FIG. 9 is a schematic diagram of a power generating device of FIG. 8.
Figure 10:
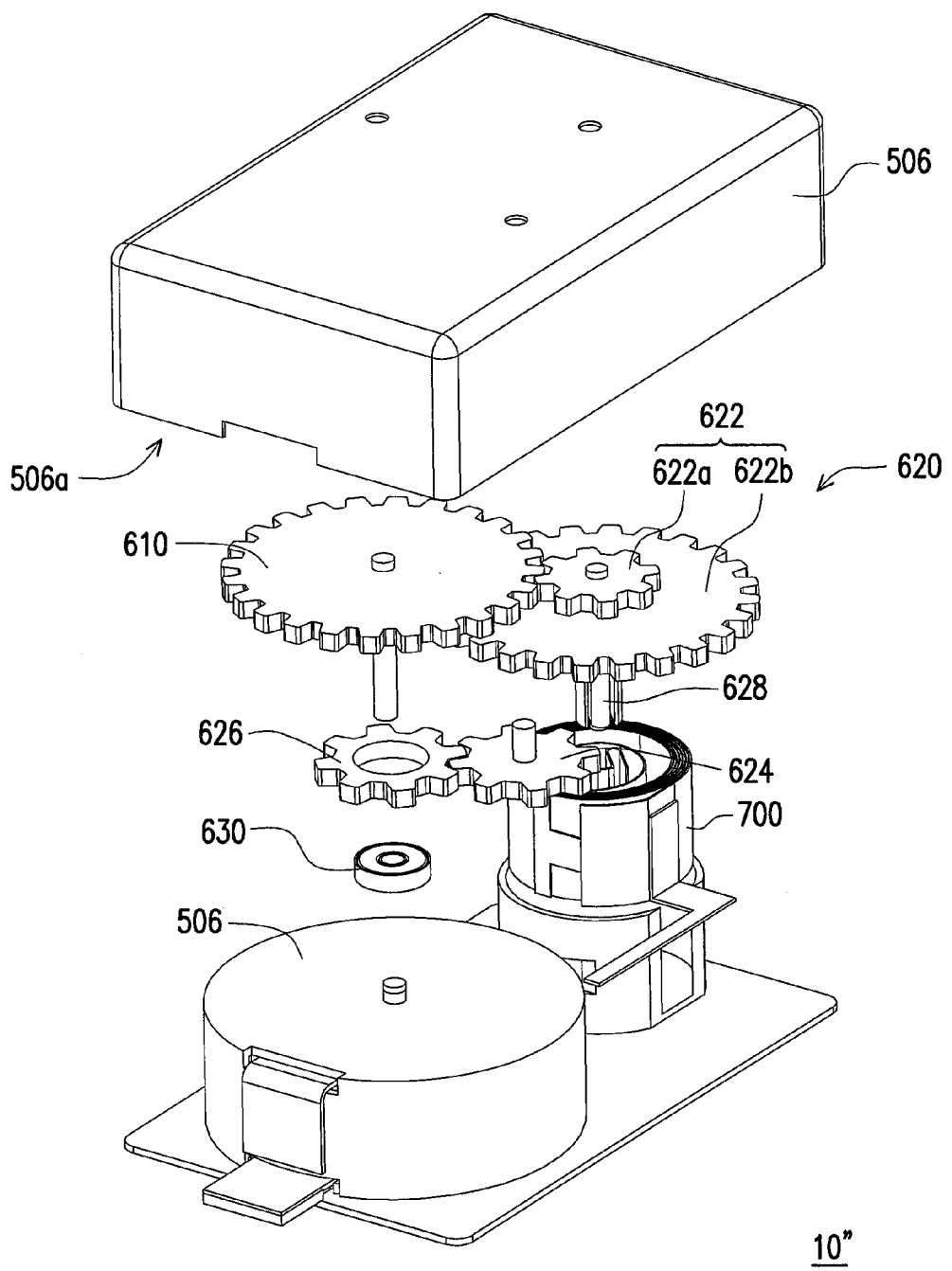
FIG. 10 is a partial exploded view of a power generating device of FIG. 9.

FIG. 8 is a perspective view of a handheld electronic device assembled with a power generating device according to still another embodiment of the present invention. FIG. 9 is a schematic diagram of the power generating device of FIG. 8. FIG. 10 is a partial exploded view of the power generating device of FIG. 9. Referring to FIG. 8, FIG. 9 and FIG. 10, in the present embodiment, the handheld electronic device 20' is, for example, a bar-type mobile phone.

The power generating device 10" includes a second top cover 506, and the manual operating module 610, the steering module 620 and the one-way bearing 630 are located in a second containing space 506a defined by internal of the second top cover 506. It should be noticed that in the present embodiment, the power generating device 10" is disposed at a side part of the handheld electronic device 20', and the manual operating module 610 partially protrudes out from a sidewall 506b of the second top cover 506. Therefore, the user can hold the handheld electronic device 20' by a right hand, and directly push the manual operating module 610 by a left hand.

Figure 11:
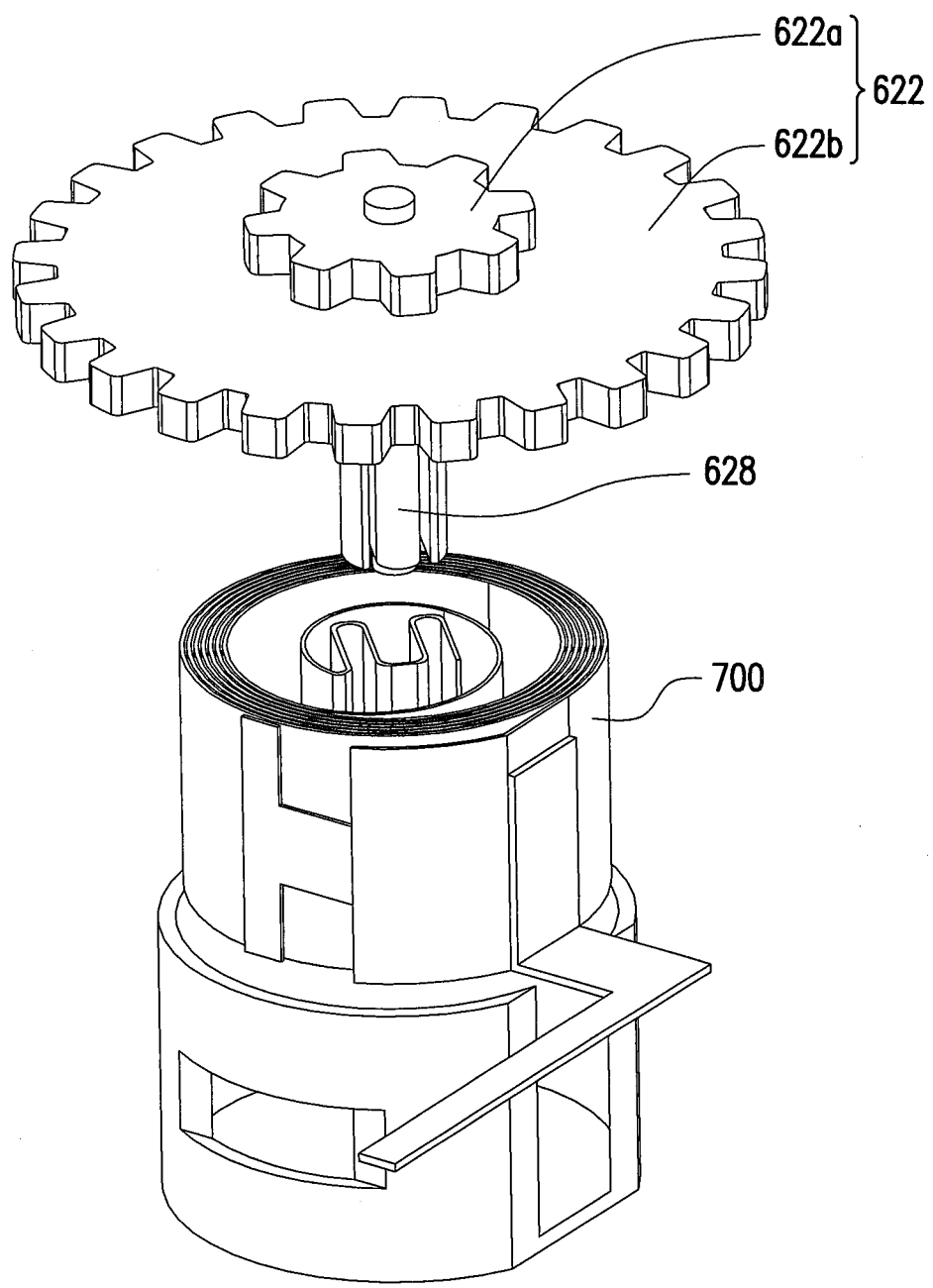
FIG. 11 is an amplified diagram of a first gear module, a rotation shaft and a flexible piezoelectric module of FIG. 10.
Figure 12:
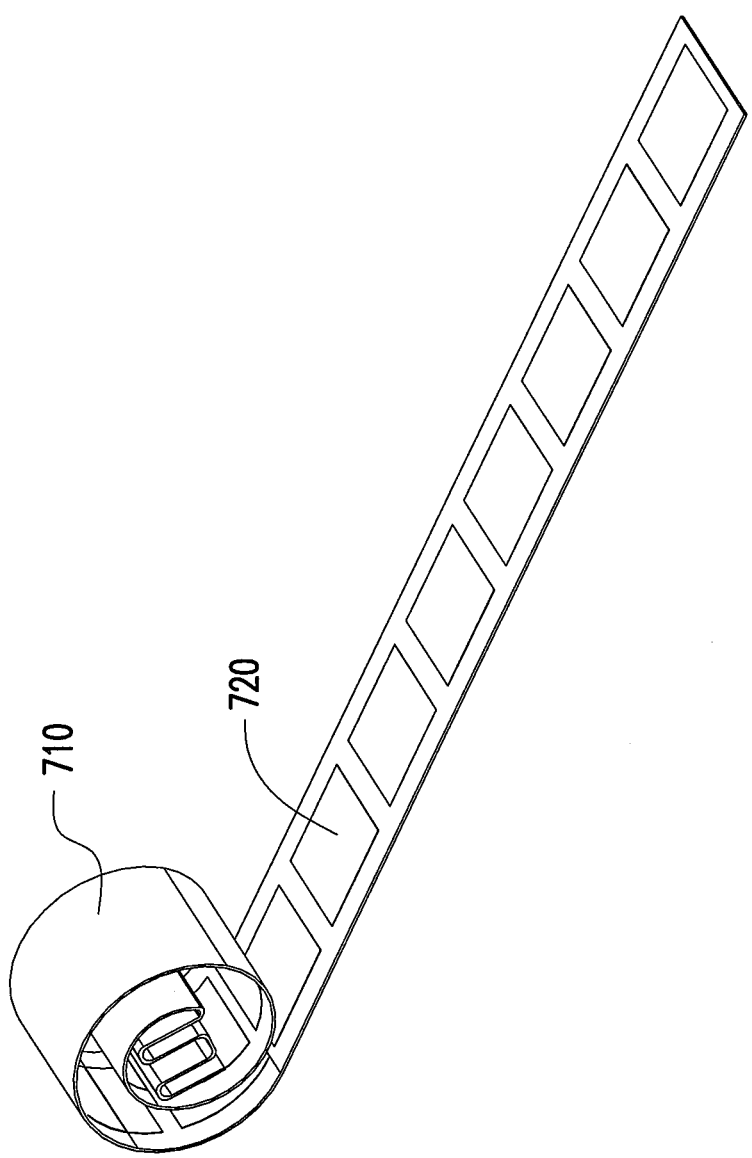
FIG. 12 is a partial expanded diagram of a flexible piezoelectric module of FIG. 10.

FIG. 11 is an amplified diagram of a first gear module, a rotation shaft and a flexible piezoelectric module of FIG. 10. FIG. 12 is a partial expanded diagram of the flexible piezoelectric module of FIG. 10. Referring to FIG. 10, FIG. 11 and FIG. 12, the steering module 620 includes the first gear module 622, the second gear module 624, the third gear module 626 and the rotation shaft 628. Moreover, the first gear module 622 includes an active gear 622a and a transmission gear 622b, wherein the active gear 622a and the transmission gear 622b all cover the rotation shaft 628. Particularly, the active gear 622a and the transmission gear 622b may have different number of teeth for adjusting a speed ratio.

In the present embodiment, the manual operating module 610 can be a wheel having a plurality of teeth, and the active gear 622a is meshed between the manual operating module 610 and the transmission gear 622b. The second gear module 624 is meshed between the transmission gear 622b and the third gear module 626. Moreover, the third gear module 626 covers the one-way bearing 630.

The power generating device 10" further includes a flexible piezoelectric module 700 surrounding the rotation shaft 628, and one end of the flexible piezoelectric module 700 is connected to the rotation shaft 628. In the present embodiment, the flexible piezoelectric module 700 includes a flexible metal substrate 710 and a plurality flexible piezoelectric sheets 720, wherein the flexible piezoelectric sheets 720 are located at a side of the flexible metal substrate 710, and the flexible piezoelectric sheets 720 are connected in parallel to increase an output current amount.

For example, the manual operating module 610 can be pushed to rotate clockwise, which can drive the first gear module 622 and the flexible piezoelectric module 700 to rotate anticlockwise. When the flexible piezoelectric module 700 is tightened, the flexible piezoelectric sheets 720 are squeezed by the flexible metal substrate 710 to generate a current for the handheld electronic device 20'. Moreover, since a number of teeth of the active gear 622a is less than that of the transmission gear 622b, the flexible piezoelectric module 700 can be tightened in acceleration.

On the other hand, when the flexible piezoelectric module 700 is released, an elastic restoring force is generated to drive the rotation shaft 628 and the first gear module 622 to rotate inversely. Therefore, the transmission gear 622b rotated clockwise can drive the one-way bearing 630 and the rotating axle 320 to rotate clockwise through the second gear module 624 and the third gear module 626. Therefore, in the power generating device 10", the rotating axle 320 can be rotated by the manual operating module 610, and the rotating axle 320 can drive the rotor module 300 to rotate. Therefore, the induction coils 420 can generate the first induction current, and the driving coils 220 can generate the second induction current, so as to manually charge the handheld electronic device 20'.

In summary, in the power generating device of the present invention, the induction coils output an induction current to automatically charge the handheld electronic device according to the varying magnetic field generated by the multipolar magnetic rotor. Moreover, when the power of the rechargeable battery within the handheld electronic device is exhausted, the power generating device can also manually charge the handheld electronic device by sliding the slide cover relative to the body to drive the manual operating module. In addition, the mechanical energy generated by pushing the manual operating module can be transferred into electrical energy. Moreover, in the power generating device, the flexible piezoelectric module can be tightened through the manual operating module to generate a current, so as to charge the handheld electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, having an automatic charging mode and a manual charging mode, the handheld electronic device comprising:
a body, having a rechargeable battery and a power generating device, the power generating device having an induction coil, a multipolar magnetic rotor and a driving coil, wherein the driving coil is powered by the rechargeable battery under the automatic charging mode, and drives the multipolar magnetic rotor to rotate, so that the induction coil generates an induction current;
a slide cover, slidingly disposed on the body; and
a manual operating module, disposed on the slide cover, wherein when power of the rechargeable battery is inadequate, the manual operating module drives the multipolar magnetic rotor to rotate, so that the driving coil and the induction coil respectively generate an induction current under the manual charging mode to charge the rechargeable battery.

2. The handheld electronic device as claimed in claim 1, wherein the power generating device further comprises:
a carrier module, having a bearing;
a stator module, assembled to the carrier module, and having a first circuit board and the driving coils, wherein a current is input to the driving coils through the first circuit board to generate an electromagnetic field;
a rotor module, located in the electromagnetic field, and having the multipolar magnetic rotor and a rotating axle, the rotating axle passing through the multipolar magnetic rotor, and one end of the rotating axle being fixed into the bearing, wherein a magnetic field of the multipolar magnetic rotor interacts with the electromagnetic field to make the rotor module rotating relative to the stator module, and make the multipolar magnetic rotor generating a varying magnetic field; and
a power generating module, located in the varying magnetic field, and having a second circuit board and the induction coils, wherein the induction coils induct the varying magnetic field to output the induction current to the second circuit board.

3. The handheld electronic device as claimed in claim 2, wherein the power generating device further comprises:
a steering module, engaged to the manual operating module; and
a one-way bearing, covering the rotating axle, and unidirectionally born between the rotating axle and the steering module, wherein when the driving coils are not input by the current, the manual operating module drives the one-way bearing and the rotating axle to rotate together through the steering module, so that the rotor module is rotated relative to the power generating module, and the induction coils generate a first induction current, and meanwhile the rotor module is rotated relative to the stator module, and the driving coils generate a second induction current.

4. The handheld electronic device as claimed in claim 3, wherein the manual operating module comprises a rack meshed with the steering module.

5. The handheld electronic device as claimed in claim 3, wherein the steering module comprises a first gear module, a second gear module, a third gear module and a rotation shaft, the first gear module is meshed with the manual operating module, and the first gear module and the second gear module cover the rotation shaft, the second gear module is meshed with the third gear module, and the third gear module covers the one-way bearing, the manual operating module drives the second gear module to rotate through the first gear module, and the second gear module drives the one-way bearing and the rotating axle to rotate together through the third gear module, so that the rotating axle drives the rotor module to rotate.

6. The handheld electronic device as claimed in claim 3, wherein the power generating device further comprises a first top cover, and the second gear module, the third gear module and the one-way bearing are located in a first containing space defined by internal of the first top cover.

7. The handheld electronic device as claimed in claim 6, wherein the first top cover has an assembling hole, the manual operating module and the first gear module are located on the first top cover, and the rotation shaft passes through the assembling hole and is covered by the first gear module.

8. A handheld electronic device having an automatic charging mode and a manual charging mode, the handheld electronic device comprising:
a body, having a rechargeable battery and a power generating device, the power generating device having an induction coil, a multipolar magnetic rotor and a driving coil, wherein the driving coil is powered by the rechargeable battery under the automatic charging mode, and drives the multipolar magnetic rotor to rotate, so that the induction coil generates an induction current; and
a manual operating module, disposed on the body, wherein when the power of the rechargeable battery is inadequate, the manual operating module drives the multipolar magnetic rotor to rotate, so that the driving coil and the induction coil respectively generate an induction current under the manual charging mode to charge the rechargeable battery.

9. The handheld electronic device as claimed in claim 8, wherein the power generating device further comprises:
a carrier module, having a bearing;
a stator module, assembled to the carrier module, and having a first circuit board and the driving coils, wherein a current is input to the driving coils through the first circuit board to generate an electromagnetic field;
a rotor module, located in the electromagnetic field, and having the multipolar magnetic rotor and a rotating axle, the rotating axle passing through the multipolar magnetic rotor, and one end of the rotating axle being fixed into the bearing, wherein a magnetic field of the multipolar magnetic rotor interacts with the electromagnetic field to make the rotor module rotating relative to the stator module, and make the multipolar magnetic rotor generating a varying magnetic field; and
a power generating module, located in the varying magnetic field, and having a second circuit board and the induction coils, wherein the induction coils induct the varying magnetic field to output the induction current to the second circuit board.

10. The handheld electronic device as claimed in claim 9, wherein the power generating device further comprises:
a steering module, engaged to the manual operating module; and
a one-way bearing, covering the rotating axle, and unidirectionally born between the rotating axle and the steering module, wherein when the driving coils are not input by the current, the manual operating module drives the one-way bearing and the rotating axle to rotate together through the steering module, so that the rotor module is rotated relative to the power generating module, and the induction coils generate a first induction current, and meanwhile the rotor module is rotated relative to the stator module, and the driving coils generate a second induction current.

11. The handheld electronic device as claimed in claim 9, wherein the manual operating module comprises a wheel meshed with the steering module.

12. The handheld electronic device as claimed in claim 10, wherein the power generating device further comprises a second top cover, and the manual operating module, the steering module and the one-way bearing are located in a second containing space defined by internal of the second top cover, and the manual operating module partially protrudes out from a sidewall of the second top cover.

13. The handheld electronic device as claimed in claim 12, wherein the power generating device further comprises a flexible piezoelectric module surrounding the rotation shaft, wherein one end of the flexible piezoelectric module is connected to the rotation shaft, the manual operating module drives the rotation shaft and the flexible piezoelectric module to rotate together through the first gear module, so that the flexible piezoelectric module is tightened to generate a current, when the flexible piezoelectric module is released, an elastic restoring force is generated to drive the rotation shaft and the first gear module to rotate inversely, and the first gear module drives the one-way bearing and the rotating axle to rotate through the second gear module, so that the rotating axle drives the rotor module to rotate.

14. The handheld electronic device as claimed in claim 13, wherein the flexible piezoelectric module comprises a flexible metal substrate and a plurality of flexible piezoelectric sheets, the flexible piezoelectric sheets are located at a side of the flexible metal substrate, and the flexible piezoelectric sheets are connected in parallel.

* * * * *